United States Patent
Andre et al.

(10) Patent No.: US 8,094,662 B2
(45) Date of Patent: *Jan. 10, 2012

(54) METHODS AND APPARATUS TO LIMIT TRANSMISSION OF DATA TO A LOCALIZED AREA

(75) Inventors: Michael R. Andre, Beaverton, OR (US); C. Brendan S. Traw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/459,770

(22) Filed: Jul. 7, 2009

(65) Prior Publication Data

US 2010/0008364 A1    Jan. 14, 2010

Related U.S. Application Data

(63) Continuation of application No. 10/356,150, filed on Jan. 31, 2003, now Pat. No. 7,558,265.

(51) Int. Cl.
*H04L 12/56* (2006.01)
(52) U.S. Cl. ............... 370/392; 370/242; 370/352
(58) Field of Classification Search ............ 370/242, 370/244, 352–354, 356, 389, 392, 230, 230.1, 370/231, 235
See application file for complete search history.

(56) References Cited

U.S. PATENT DOCUMENTS

| | | | |
|---|---|---|---|
| 5,708,654 A | 1/1998 | Arndt et al. | |
| 5,850,386 A | 12/1998 | Anderson et al. | |
| 6,069,889 A | 5/2000 | Feldman et al. | |
| 6,130,889 A | 10/2000 | Feldman et al. | |
| 6,192,404 B1 | 2/2001 | Hurst et al. | |
| 6,295,296 B1 | 9/2001 | Tappan | |
| 6,337,861 B1 | 1/2002 | Rosen | |
| 6,339,595 B1 | 1/2002 | Rekhter et al. | |
| 6,501,756 B1 | 12/2002 | Katsube et al. | |
| 6,526,044 B1 | 2/2003 | Cookmeyer, II et al. | |
| 6,687,247 B1 | 2/2004 | Wilford et al. | |
| 6,760,309 B1 * | 7/2004 | Rochberger et al. | 370/235 |
| 6,795,863 B1 | 9/2004 | Doty, Jr. | |
| 6,834,310 B2 * | 12/2004 | Munger et al. | 709/232 |
| 6,862,622 B2 | 3/2005 | Jorgensen | |
| 6,920,133 B1 | 7/2005 | Boodaghians | |
| 6,958,998 B2 | 10/2005 | Shorey | |
| 7,082,129 B2 | 7/2006 | Cromer et al. | |
| 7,126,944 B2 | 10/2006 | Rangarajan et al. | |

(Continued)

OTHER PUBLICATIONS

Connected: An Internet Encyclopedia, Operation, Freesoft.org, accessed on Dec. 3, 2002, Available at:—httn://www.freesoft.org/CIE/Course/Section3/2.htm.

(Continued)

*Primary Examiner* — Kevin Mew
(74) *Attorney, Agent, or Firm* — Barre Law Firm, PLLC

(57) ABSTRACT

Methods and apparatus are disclosed for limiting transmission of data to a localized area in a networked environment. In an example method, a request to transmit data from a source device to a sink device is received. If the data to be transmitted is localized data, a time to live value associated with the data is set to first predetermined value. If the data to be transmitted is not localized data, a time to live value associated with the data is set to a second predetermined value.

24 Claims, 8 Drawing Sheets

U.S. PATENT DOCUMENTS

| | | | |
|---|---|---|---|
| 7,139,271 B1 | 11/2006 | Parruck et al. | |
| 7,171,683 B2 | 1/2007 | Pazi et al. | |
| 7,200,146 B2 | 4/2007 | Khosravi et al. | |
| 7,388,869 B2 * | 6/2008 | Butehorn et al. | 370/401 |
| 7,554,907 B1 * | 6/2009 | Epps et al. | 370/230 |
| 7,558,265 B2 * | 7/2009 | Andre et al. | 370/392 |
| 7,961,727 B2 * | 6/2011 | Duncan et al. | 370/389 |
| 2002/0150094 A1 * | 10/2002 | Cheng et al. | 370/389 |
| 2003/0002675 A1 * | 1/2003 | Graunke | 380/259 |
| 2003/0028585 A1 * | 2/2003 | Yeager et al. | 709/201 |
| 2004/0139170 A1 | 7/2004 | Shen et al. | |
| 2007/0076605 A1 * | 4/2007 | Cidon et al. | 370/230 |

OTHER PUBLICATIONS

Connected: An Internet Encyclopedia, IP Protocol Overview, Freesoft.org, accessed on Dec. 3, 2002, Available at: http://www.freesoft.org/CIE/Course/Section3/3.htm.

Connected: An Internet Encyclopedia, Datagrams and Streams, Freesoft.org, accessed on Dec. 3, 2002, Available at: http://www.freesoft.org/CIE/Course/Section3/5.htm.

Connected: An Internet Encyclopedia, Model of Operation, Freesoft.org, accessed on Dec. 3, 2002, Available at: http://www.freesoft.org/CIE/Course/Section3/6.htm.

Connected: An Internet Encyclopedia; IP Packet Structure, Freesoft.org, accessed on Dec. 3, 2002, Available at: http://www.freesoft.org/CIE/Course/Section3/7.htm.

Connected: An Internet Encyclopedia, RFC Examples, Freesoft.org, accessed on Dec. 3, 2002, Available at: http://www.freesoft.org/CIE/Course/Section3/9,htm.

"5C Digital Transmission Content Protection—White Paper", Hitachi Ltd.,Intel Corporation, Matsushita Electric Industrial Co., Ltd., Sony Corporation, Toshiba Corporation. Revision 1.0., Jul. 14, 1998, 15 pages.

Pearson, B., Digital Transmission Content Protection, Intel Corporation, Jun. 16, 1999, 25 pages.

* cited by examiner

METHODS AND APPARATUS TO LIMIT TRANSMISSION OF DATA TO A LOCALIZED AREA

RELATED APPLICATION

This application is a Continuation of U.S. patent application Ser. No. 10/356,150, entitled "METHODS AND APPARATUS TO LIMIT TRANSMISSION OF DATA TO A LOCALIZED AREA," filed on Jan. 31, 2003. This application is entirely incorporated by reference.

FIELD OF THE DISCLOSURE

This disclosure relates generally to data transmission restriction, and, more particularly, to methods and apparatus to limit transmission of data to a localized area in a networked environment.

BACKGROUND

In recent years, consumers have demanded increased access to copyrighted content (e.g., movies, music, books, etc.) in digital form via cable television, satellite broadcasting, the Internet, digital versatile disks (DVD), compact disks (CDs), etc. Because this valuable content is provided in a digital format at high quality levels, and because digital data is highly reproducible, pirates have frequently sought to usurp the profits of the copyright holders by making and selling unauthorized copies of this digital content. Efforts have been underway to provide mechanisms for limiting unauthorized copying and distribution of this copyrighted content to ensure the copyright holders are rewarded for the consumption of their intellectual property.

To address some of these concerns, a group of technology companies recently developed Digital Transmission Content Protection (DTCP) technology. DTCP provides a protocol in which various cryptographic techniques are employed to prevent unauthorized copying and distribution of digital content. In DTCP, copy control information (CCI) is carried by the digital content. The CCI specifies the conditions for copying the associated content. For example, digital content may be classified by the CCI such that (a) the content may be freely copied (no authentication required to access the content and no encryption needed to transmit the content), (b) the content may never be copied, or (c) one generation of copies may be made of the content and then classified as (d) no more copies. To access digital content protected by DTCP, a device must be authorized (i.e., have access to the decryption key(s) used to unlock the content). If an authorized device is instructed to copy the digital content, the authorized device will read the CCI information and abide by the criteria set therein. Thus, the CCI information ensures that all DTCP content carries a set of rules governing reproduction of that content, which has the salutary effect of preventing pirates from purchasing one legitimate copy of copyrighted content and then making multiple unauthorized copies.

While DTCP is a significant advance in controlling distribution and copying of digital content, the recent proliferation of digital technology in the home environment presents additional challenges to controlling copyrighted materials. For example, it is becoming more common for a home to include a home Internet Protocol (IP) based network in which a number of entertainment and/or information devices (e.g., a computer, a DVD player, a digital or analog video recorder, a television, etc) are networked. Thus, it is frequently desirable to transfer copies of copyrighted material from device to device within the home. Often, the home network is coupled to the Internet, thereby raising the possibility of transferring unauthorized copies of copyrighted material from one Internet Protocol home network to another.

Efforts are underway to apply DTCP technology to the IP home network context. However, it is desirable to permit an authorized licensee of digital content to transfer that digital content from device to device within the home network. Thus, a significant impediment to applying DTCP to the home IP based network comprises permitting movement of content within the home IP network, while preventing distribution of that content beyond the home via the Internet.

DETAILED DESCRIPTION

Figure 1:
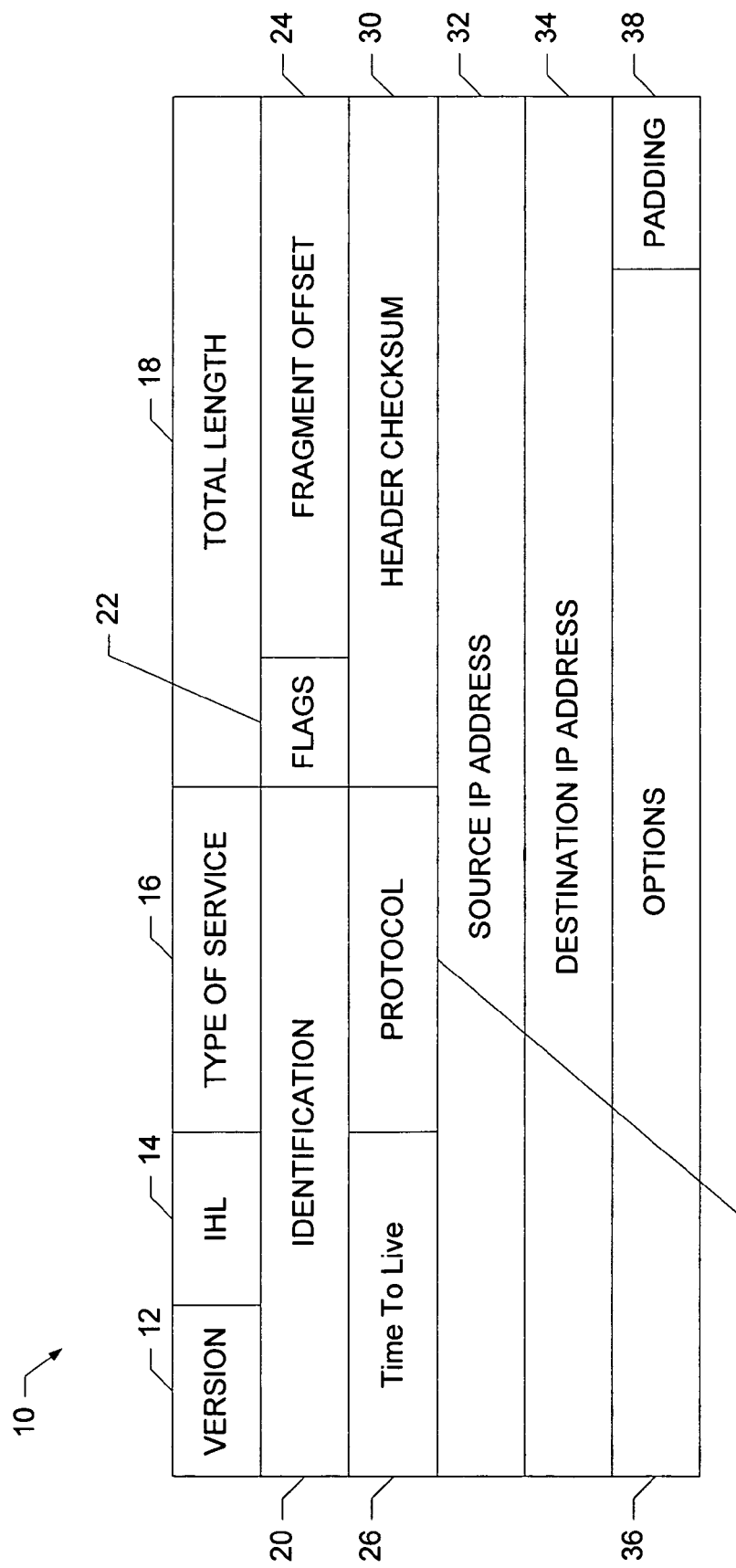
FIG. 1 is a schematic illustration of a prior art Internet Protocol header.

FIG. 1 is a schematic illustration of a prior art Internet Protocol header 10. As is well known, whenever data is to be transmitted in a network operating in accordance with the Internet Protocol, a source device seeking to transmit the data must format the data into a datagram including one or more independent packets. Each packet is treated independently by the routers/switches in the IP network, such that the packets in a datagram transmitted from a source device to a sink device may be separated and routed through different channels and reassembled at the sink device. Therefore, each packet must contain the addressing information necessary to route the packet to the intended sink device. To this end, each packet is provided with an Internet Protocol (IP) header 10 as shown in FIG. 1. Every IP packet is structured to include an IP header 10 followed by a data field.

The IP header 10 contains many well known fields including, for example, a version field 12, an Internet header length field 14, a type of service field 16, a total length field 18, an identification field 20, a flags field 22, a fragment offset field 24, a time to live field 26, a protocol field 28, a header checksum field 30, a source address field 32, a destination address field 34, an options field 36, and a padding field 38. These fields are well known to persons of ordinary skill in the art and, with the exception of the time to live field 26, will not be discussed in detail herein.

The time to live field 26 is used to ensure that undeliverable packets transmitted through the Internet do not eternally flow from router to router thereby reducing Internet performance. In particular, the time to live field 26 is set to a value indicating the maximum life that the associated packet may have in the Internet. Every time a packet is handled by a router or switch (as used herein the terms router, switch, and router/switch are interchangeable) operating in accordance with the Internet Protocol, the router/switch reduces the value appearing in the time to live field 26 of the header 10 by one. If a router/switch receives a packet having a value in the time to live field 26 which is equal to zero, it destroys the packet. This technique ensures that undeliverable IP packets do not congest the network in the event of routing loops caused, for example, by corrupted routing tables.

The time to live field 26 uses seconds as its unit of measure. However, since some router/switches will process a packet in less than one second, the time that an undeliverable packet lives in the Internet may be less than the number of seconds indicated in the time to live parameter. Since every IP router/switch that handles a packet decrements the value in the time to live field 26 by one regardless of the actual time it takes the router/switch to process the packet, the value in the time to live field 26 may be thought of as a measure of the number of IP routers/switches that may handle a packet before it is assumed undeliverable and destroyed. Typically, the time to live field 26 is set to a value of 30 or higher.

Figure 2:
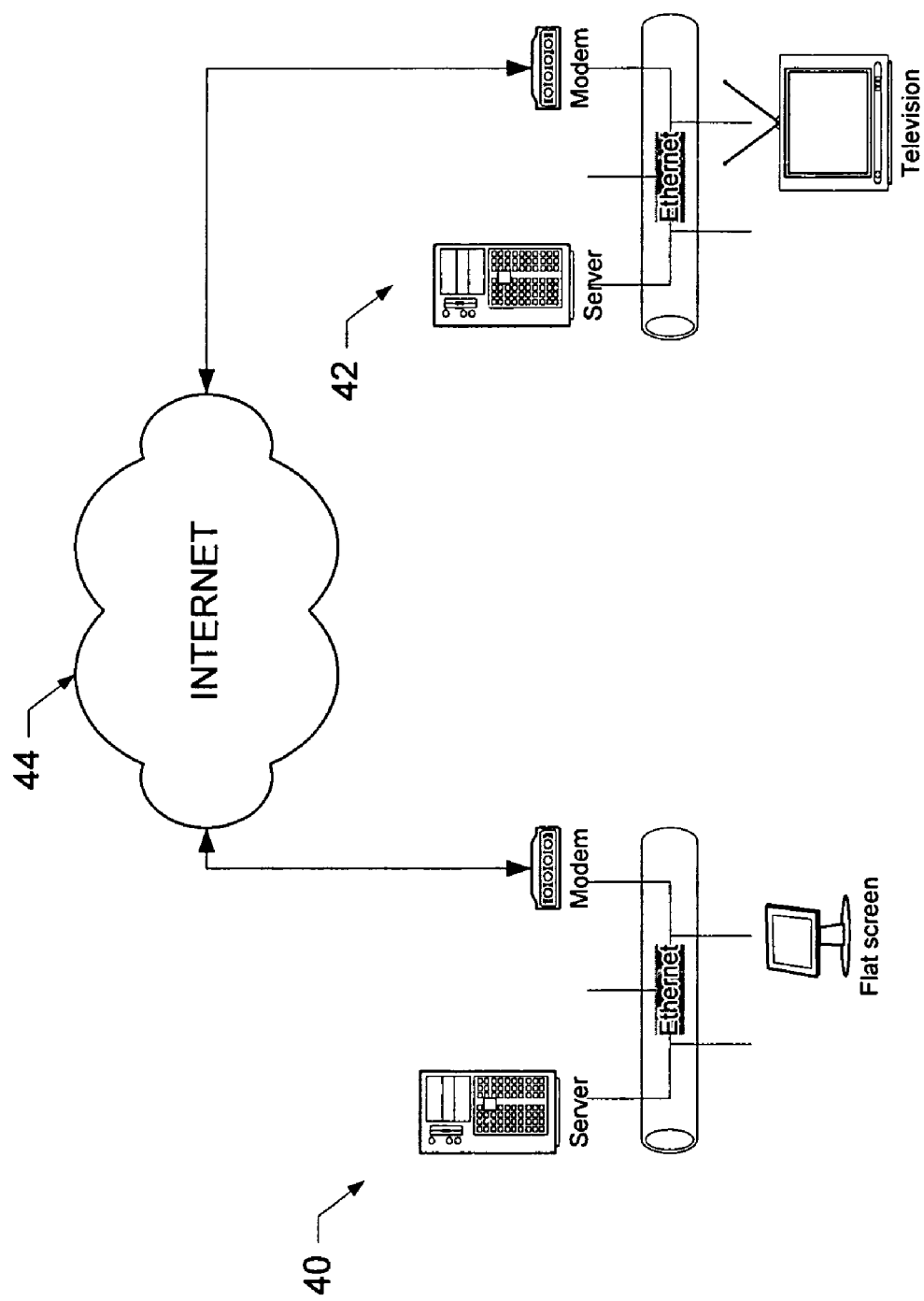
FIG. 2 is a schematic illustration of an example Networked environment in which the example methods and apparatus disclosed herein may be employed.

FIG. 2 illustrates an example networked environment. In the illustrated example, a first home network 40 is coupled to a second home network 42 via the Internet 44. If the first home network 40 is authorized to access localized content, it is desirable for that content to be freely routed within the confines of the home network 40. However, it is not desirable to permit the localized content to be transmitted to the second home network 42 for unauthorized consumption. As used herein, localized content refers to any data and/or instruction wherein the distribution or transmission of that data and/or instruction is intended to be limited to a local area of a networked environment. Localized data can be proprietary or public, restricted or unrestricted. For example, it is desirable to ensure a UPnP (universal plug and play) command issued in one home network does not reach a second home network where it can cause an unwanted effect (e.g., a command to turn on the television in one house turns on a television in a neighbor's house). Therefore, a UPnP instruction may be localized data since transmission of the UPnP instruction is intended to be limited to the local (e.g., home) network. As another example, localized data may comprise a digital movie wherein it is desirable to prevent transmission of the movie beyond the boundary of a home network.

Figure 3:
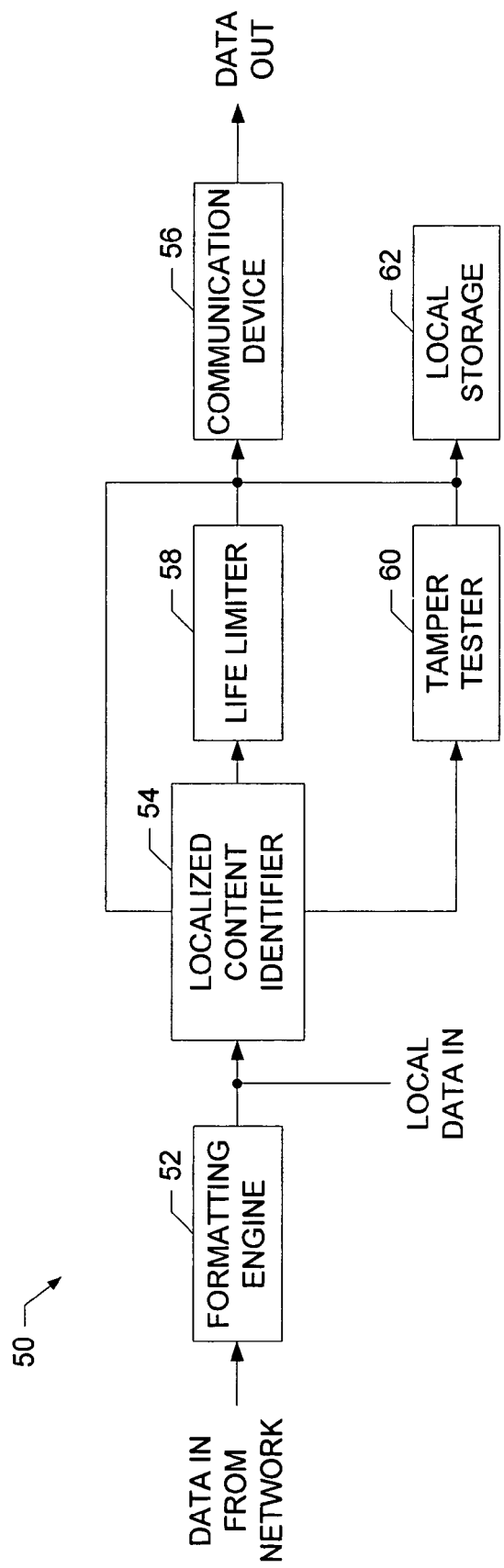
FIG. 3 is a schematic illustration of an example apparatus to limit transmission of data to a localized area in a networked environment.

An example apparatus 50 to limit exchange of localized data is shown in FIG. 3. The illustrated apparatus 50 limits transmission of localized data to a localized area of the network, for example, to the home network 40, 42 in which the apparatus 50 is located. For purposes of discussion, it will be assumed in the following that the apparatus 50 is located in the first home network 40, the first home network 40 is authorized to access the localized content, and the second home network 42 is not authorized to access the localized content.

For the purpose of preparing digital data for transmission in accordance with the Internet Protocol, the apparatus 50 of FIG. 3 is provided with a formatting engine 52. The formatting engine 52 responds to a request to send data over an IP based network by developing an Internet datagram including one or more Internet headers 10 in accordance with well known techniques. For example, the formatting engine 52 populates one or more IP headers 10 for the data to be transmitted with the information needed pursuant to the Internet Protocol. For instance, the formatting engine 52 completes the version field 12, the Internet header length field 14, the type of service field 16, the total length field 18, the identification field 20, the flags field 22, the fragment offset field 24, the time to live field 26, the protocol field 28, the header checksum field 30, the source address field 32, the destination address field 34, the options field 36, and the padding field 38 in the IP header(s) 10. The formatting engine 52 sets the time to live field 26 to a standard value sufficient to ensure that a deliverable packet will reach any destination on the Internet (e.g., 30), but that undeliverable packets will be implicitly identified and destroyed in a reasonable length of time (e.g., 30 seconds or less, depending on the speed of the routers/switches that process the packets).

In order to determine if the data to be transmitted is localized data, the apparatus 50 is further provided with a localized content identifier 54. The localized content identifier 54 may identify localized content by, for example, reading a code associated with the data to be transmitted. For instance, if the data to be transmitted is protected by DTCP, the localized content identifier 54 may determine the classification of the content by reading the CCI code. Of course, other encoding schemes may be employed to designate localized content. For example, localized content may be packaged to include a header that designates the protection level of the content (e.g., ranging from "one use" to "freely copy").

Irrespective of the precise mechanism chosen to identify localized content, if the localized content identifier 54 identifies the content to be transmitted as unrestricted to the local network, then it forwards the packet(s) associated with that content to a communication device 56 (e.g., a modem, etc.) for transmission via the network (e.g., the network 40, 42 and/or 44). If, on the other hand, the localized content identifier 54 identifies the content to be transmitted as localized (i.e., restricted to transmission within a local area of the network), instead of routing the data immediately to the network via the communication device 56, it permits a life limiter 58 to process the data.

The life limiter 58 sets the time to live field 26 associated with the localized data to a value which limits the number of IP routers/switches that may handle the localized data before the localized data is destroyed to a level that substantially precludes exchange of the localized data between the source device in the home network 40 and a sink device in a second home network (e.g., network 42). As discussed above, the formatting engine 52 sets the time to live field 26 in the IP header(s) 10 associated with the datagram carrying the localized data to the normal value (e.g., thirty) for standard Internet transmission of data whose transmission area is not restricted. If the localized content identifier 54 identifies the content to be transmitted as localized data, the life limiter 58 reduces the value in the time to live field 26 to a level lower than that required for standard Internet transmission to thereby substantially limit transmission of the localized data to a local area of the network (e.g., the home network 40).

The topology of IP based home networks is relatively simple when compared to the topology of the Internet. Specifically, the number of routers/switches that a packet must traverse to move between two devices in the typical home network is significantly lower than the number of routers/switches a packet must traverse to move between two end points on the Internet. Indeed, anecdotal data suggests that typical home networks have fewer than five IP routers/switches and that more than five IP routers/switches are required to traverse an Internet path between homes (even when the two homes are served by the same Internet Service Provider and are in the same geographic area). Therefore, if the life limiter 58 sets the time to live field 26 of packet(s) carrying localized data to, for example, five, the localized data packet(s) will be destroyed by the IP routers/switches before they can reach an intended destination in a second home network 42.

In particular, as stated above, IP routers/switches are currently designed to reduce the value stored in the time to live field 26 in the IP headers 10 they process by one, and to destroy any packet they encounter which has a time to live value equal to zero. Therefore, after the life limiter 58 sets the value stored in the time to live field 26 of the IP packet(s) 10 associated with the localized content to the reduced level discussed above (e.g., five), the communication device 56 is permitted to freely transmit the packet(s) toward whatever destination address has been specified by the user. If the destination address is outside a localized area (e.g., the home network 40), the packet(s) carrying the localized data will be destroyed by the IP routers/switches pursuant to their normal behavior before those packets reach their intended destination as a result of their reduced time to live settings. If, however, the intended destination is within the localized area (e.g., the home network 40), the packet(s) carrying the localized data will reach their intended destination before expiration of the shortened time to live. As a result, localized data can be freely transferred within the localized area (e.g., the home network 40), but is automatically destroyed if sent beyond the boundary of the localized area (e.g., beyond the home network 40).

To reduce the opportunity for pirates to frustrate the above described time to live mechanism for limiting transmission of localized content to a local area of a networked environment, the apparatus 50 is further provided with a tamper tester 60. Whenever the apparatus 50 receives data packet(s) from the network, those packet(s) are reviewed by the localized content identifier 54 to determine if they contain localized data. If the packet(s) do not contain localized data, they are saved in a local storage device 62 in the normal, prior art, manner for further processing by local receiving devices (e.g., a television). If, however, the packet(s) do contain localized data, the tamper tester 60 reviews their time to live fields 26 to determine if those fields have been subjected to tampering.

The tamper tester 60 may make this determination by, for example, comparing the time to live field(s) 26 of the received packet(s) to a threshold value such as the predetermined time to live value set by the life limiter 58 (e.g., five) for packets associated with localized content. If the time to live values of the received packets exceed the predetermined time to live value set by the life limiter 58 (e.g., five), the time to live field(s) 26 have been subjected to tampering. Whenever the tamper tester 60 determines that tampering has occurred, it destroys the associated received data thereby frustrating the efforts of the pirates involved in the tampering effort. If, however, no tampering is detected, the tamper tester 60 stores the packet(s) in the local storage device 62 in the normal prior art manner for further processing by local receiving devices.

Figure 4:
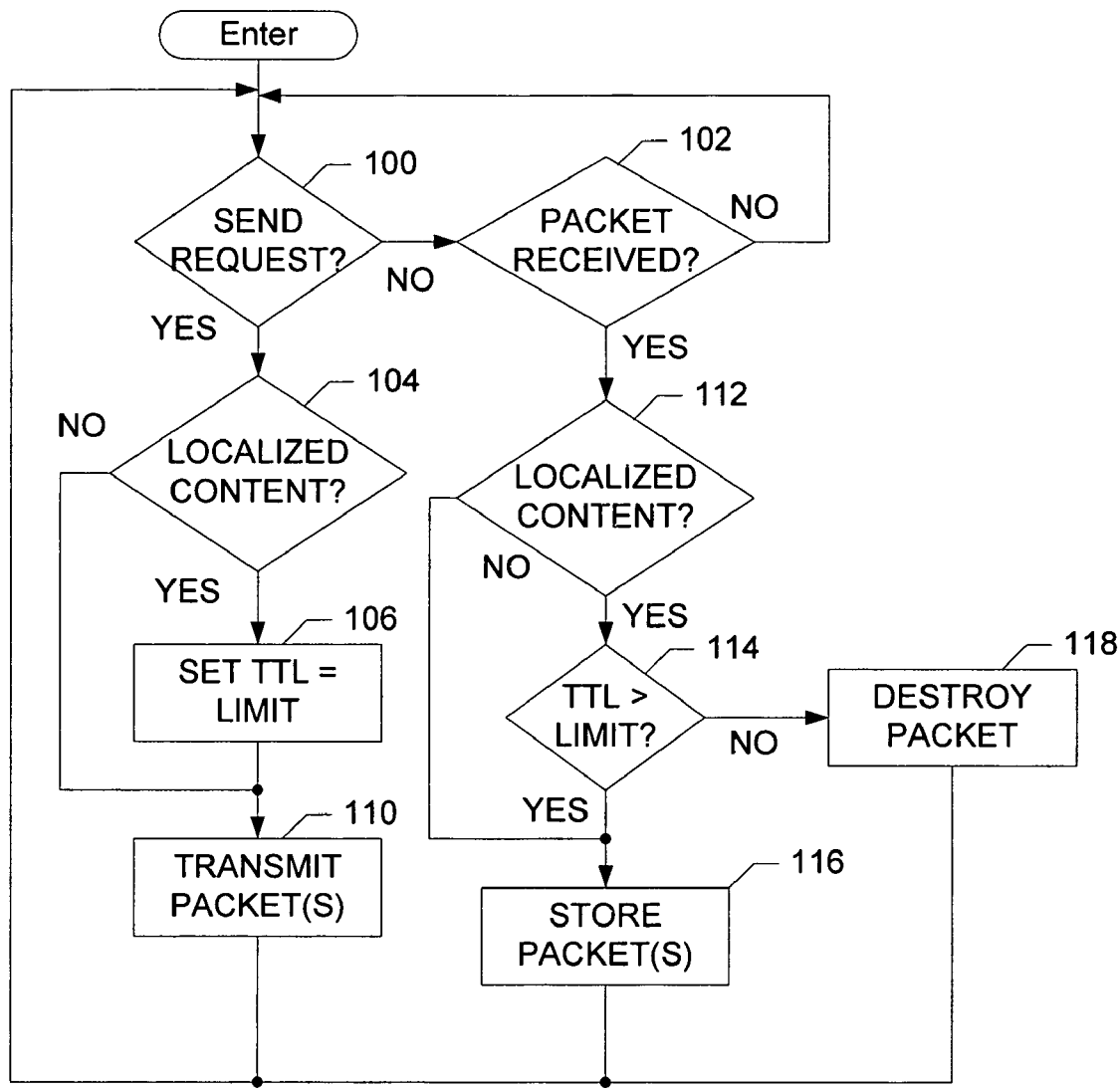
FIG. 4 is a flowchart illustrating an example program for implementing the apparatus of FIG. 3.

A flowchart representative of example machine readable instructions for implementing the apparatus 50 of FIG. 3 is shown in FIG. 4. In this example, the machine readable instructions comprise a program for execution by a processor such as the processor 1012 shown in the example computer 1000 discussed below in connection with FIG. 6. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the formatting engine 52, the localized content identifier 54, the life limiter 58, and/or the tamper tester 60 could be implemented by software, hardware, and/or firmware. Further, although the example program is described with reference to the flowchart illustrated in FIG. 4, persons of ordinary skill in the art will readily appreciate that many other methods of implementing the example apparatus 50 may alternatively be used. For example, the order of execution of the blocks may be changed, and/or some of the blocks described may be changed, eliminated, or combined.

The program of FIG. 4 begins at block 100 where the formatting engine 52 determines if a request to send data has been received. If no such request has been received, the apparatus 50 determines if a packet has been received from the network (block 102). Control continues to loop through blocks 100-102 until a request to transmit data is received (block 100) or a packet is received from the network (block 102).

Assuming that a request to send data had been received (block 100), the data is formatted by the formatting engine 52 into one or more IP packets for transmission via the network in accordance with well known formatting techniques. Control then advances to block 104. At block 104, the localized content identifier 54 determines if the data to be transmitted includes localized content. If the data includes localized content (block 104), the life limiter 58 sets the time to live field(s) 26 of the packet(s) to be transmitted to a predetermined value (e.g., five) which is sufficiently low to ensure that the packet(s) will not survive long enough to reach an IP address outside of a localized area of the network (e.g., the home network) in which the source device is located (block 106). The packet(s) are then transmitted (block 110) and control returns to block 100.

If, however, the packet(s) do not contain localized content (block 104), control advances directly from block 104 to block 110 such that the packet(s) are transmitted without adjustment to their time to live field(s) 26.

Assuming, for purposes of discussion that packet(s) are received from the network (block 102), control advances to block 112. At block 112, the localized content identifier 54 determines if the received packet(s) contain localized content. If the received packet(s) contain localized content (block 112), the tamper tester 60 compares the value(s) stored in the time to live field(s) 26 of the received packet(s) to a threshold value (e.g., five) to determine if the received packet(s) were tampered with in an effort to frustrate the transmission limit (block 114). If no tampering is detected (block 114), the tamper tester 60 forwards the packet(s) to the local storage device 62 for further processing and/or consumption (block 116). Control then returns to block 100.

If tampering is detected (block 114), the tamper tester 60 destroys the received packet(s) (block 118). Control then returns to block 100.

Figure 5:
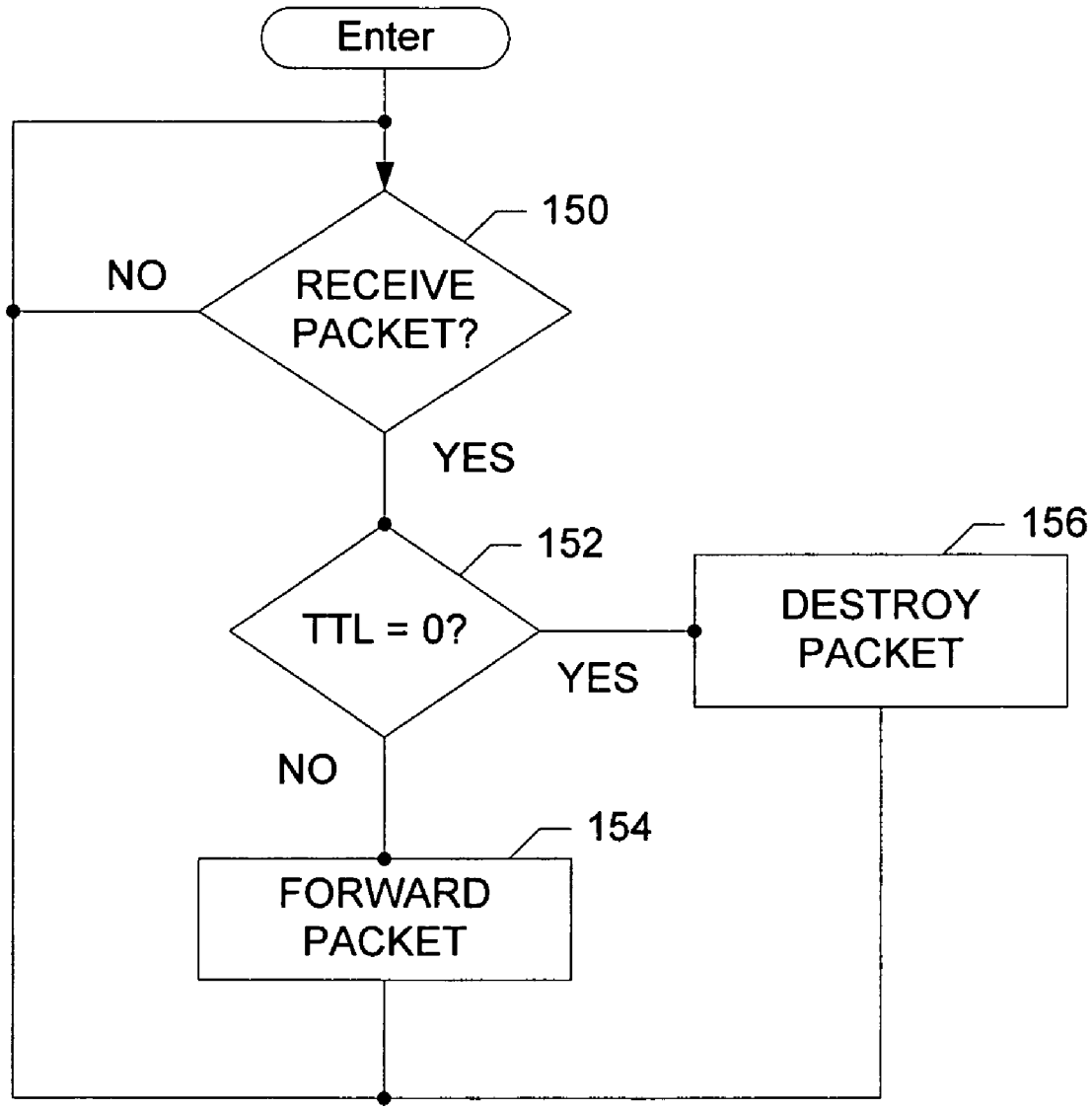
FIG. 5 is a flowchart illustrating an example prior art method of operation of a router operating in accordance with the Internet Protocol.

FIG. 5 illustrates the operation of a prior art IP router/switch. The router/switch waits to receive an IP packet (block 150). When an IP packet is received (block 150), the router/switch examines the time to live field 26 of the header 10 associated with the packet. If the value stored in the time to live field 26 is equal to zero (block 152), the router/switch forwards the packet to another router/switch or the destination address identified in the packet header in accordance with the Internet Protocol (block 154). Control then returns to block 150. If, however, the value stored in the time to live field 26 is not equal to zero (block 152), the router/switch destroys the packet (block 156). Control then returns to block 150.

As discussed above, routers and/or gateways in an Internet Protocol based network are structured to automatically decrement the time to live field 26 of every packet they route by one. To further enhance the reliability of the disclosed methods and apparatus, a gateway or router that couples the local network (e.g., home network 40) to the wide area network (e.g., the Internet 44) may be modified to decrement the time to live field 26 of every packet received from the local network by a value greater than one. For example, the router/gateway may be structured to decrement the time to live field 26 of packets received from the local network (e.g., home network 40) by a value of N, where N is the expected number of routers in the average home network (e.g., five). If the packet is associated with localized data, its time to live field 26 will have been set to a low level (e.g., five) as explained above. Thus, if selected to be large enough, the unusually large decrement of the time to live field 26 by the gateway/router will ensure that localized packets will be destroyed before entering the wide area network.

However, since non-localized packets have a normal time to live value, and since a normal time to live value is typically twice as large as needed for the packet to reach its intended destination, the unusually large decrementing of the non-localized packet by the router/gateway coupling the local network to the wide area network will not impede deliver of the non-localized packets received from the local network. Instead, the packets associated with non-localized data will enter the wide area network and be routed to their intended destinations in the ordinary fashion.

The modified router/gateway connecting the local area network to the wide area network may be structured to decrement the time to live field 26 of packets traveling to the local area network from the wide area network by the conventional amount (e.g., one). Thus, the modified router/gateway would apply a different decrement to the time to live field 26 of received packets depending upon their point of origin (e.g., the local network or the wide area network) or direction of travel (e.g., into the local network versus out of the local network).

Figure 6:
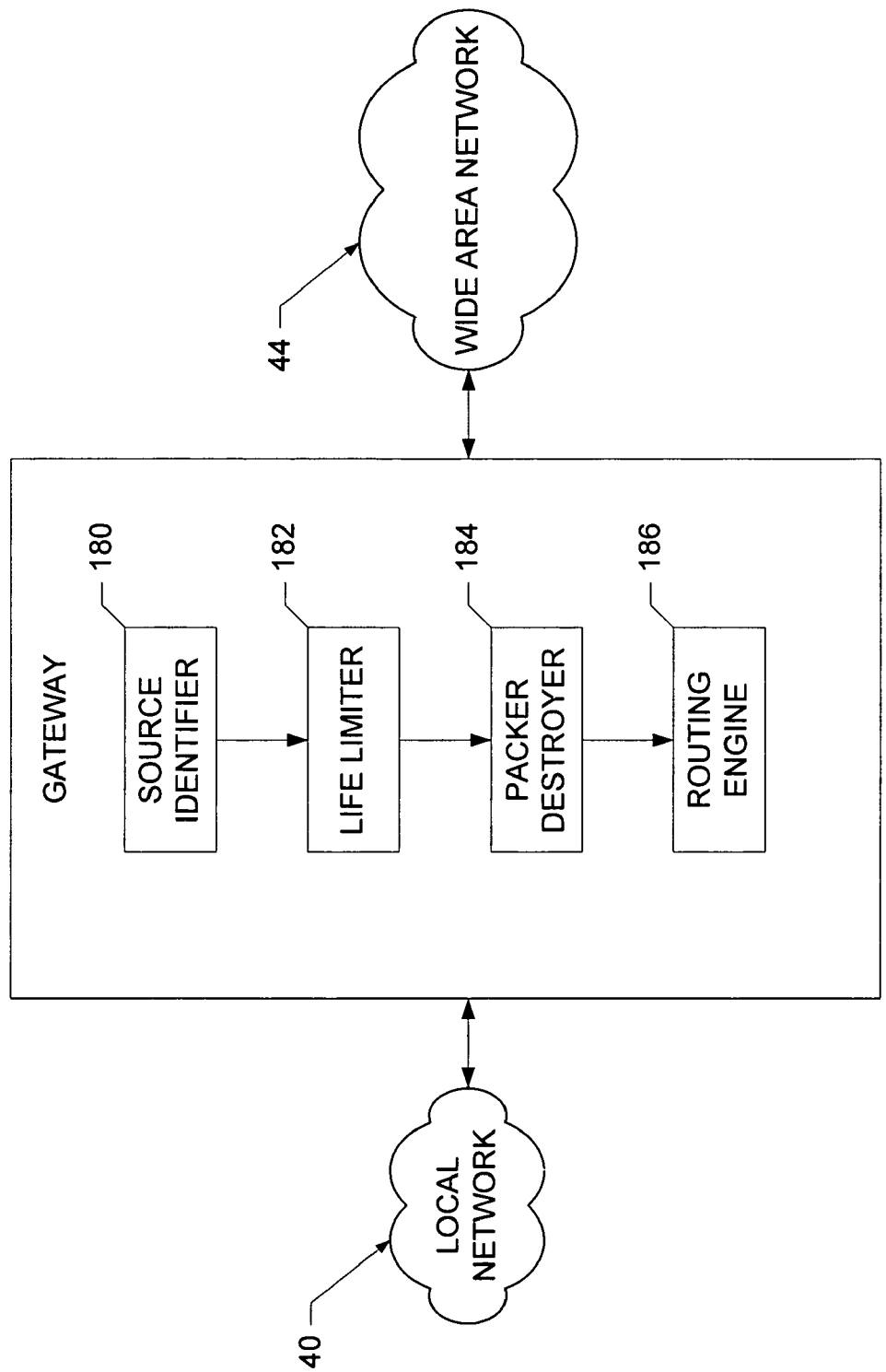
FIG. 6 is a schematic illustration of an example gateway coupling a local network to a wide area network.

An example modified gateway/router coupling a local network (e.g., home network 40) to a wide area network (e.g., the Internet) is shown in FIG. 6. As shown in FIG. 6, the modified gateway/router includes a source identifier 180 which operates to determine if a packet received at the gateway originated in the local network or the wide area network. It also includes a life limiter 182. The life limiter 182 responds to the source identifier 180 by decrementing the time to live field 26 of the received packet by a first value if the packet originated in the local network and a second value if the packet originated in the wide area network.

The example gateway of FIG. 6 also includes a packet destroyer 184 to review the value in the time to live field 26 and to destroy the associated packet if that value falls to zero in the conventional fashion of known IP routers. Also like known IP routers, the example gateway of FIG. 6 includes a routing engine 186 to route packets having a non-zero value in their time to live field 26 in accordance with the Internet Protocol.

Figure 7:
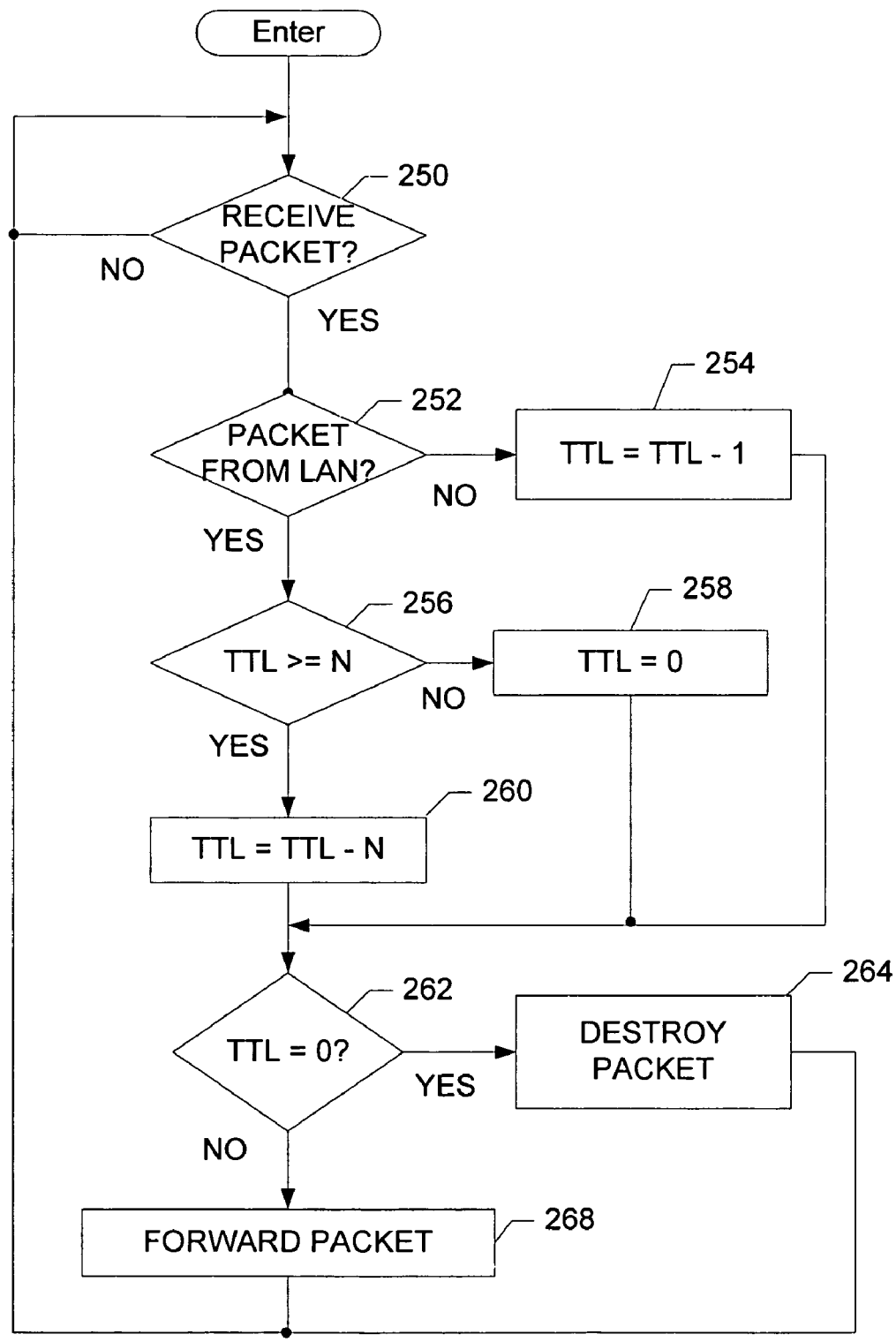
FIG. 7 is a flowchart illustrating an example method of operation of the gateway of FIG. 6.

FIG. 7 illustrates the operation of the example gateway of FIG. 6 in greater detail. The gateway/router/switch waits to receive an IP packet (block 250). When an IP packet is received (block 250), the source identifier 180 determines if the packet originated in the local network or the wide area network (block 252). If the packet was received from the wide area network (block 252), the life limiter 182 decrements the time to live field 26 by one (block 254). If the packet was received from the local network (block 252), the life limiter 182 determines if the time to live field 26 of the received packet contains a value that is less than N (block 256). If so, the life limiter 182 reduces the value in the time to live field to zero (block 258) and control advances to block 262. Otherwise, if the value in the time to live field 26 is greater than or equal to N (block 256), the life limiter 182 decrements the value in the time to live field 26 of the packet by the value N (block 260). The value N can be any desired value greater than one (e.g., five) but small enough to not interfere with transmission of non-localized data.

After the time to live field 26 is decremented by an appropriate amount (block 254, block 258 or block 260), control advances to block 262 where the packet destroyer 184 of the gateway examines the time to live field 26 of the header 10 associated with the packet. If the value stored in the time to live field 26 is equal to zero (block 262), the packet destroyer 184 destroys the packet (block 264). Control then returns to block 250. If the value in the time to live field 26 is not equal to zero (block 262), the routing engine 186 forwards the packet to another gateway/router/switch or the destination address identified in the packet header in accordance with the Internet Protocol (block 268). Control then returns to block 250.

Figure 8:
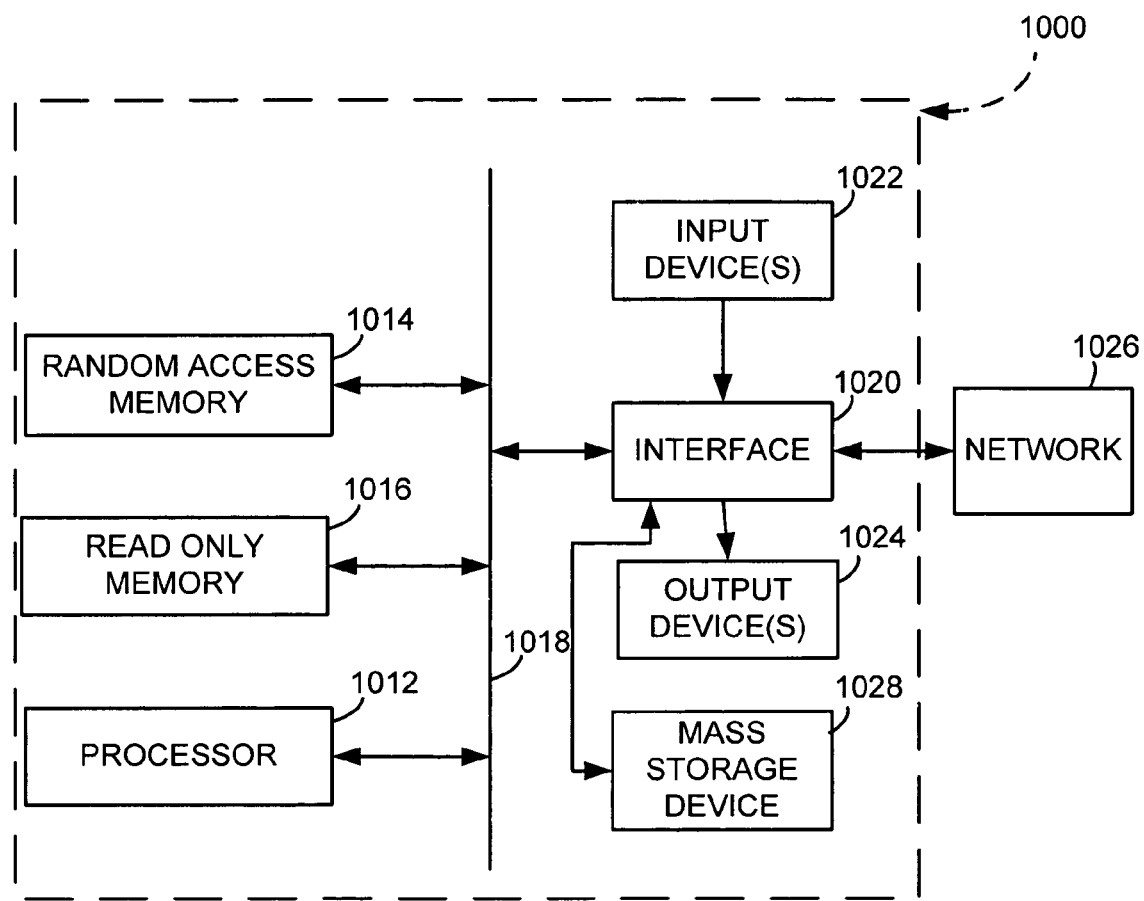
FIG. 8 is a schematic illustration of an example computer that may be used to execute the program of FIG. 4 to implement the apparatus of FIG. 3.

FIG. 8 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., communication device 56) such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the local storage device 62.

From the foregoing, persons of ordinary skill in the art will appreciate that the above disclosed methods and apparatus employ the time to live field 26 found in IP headers 10 to define the boundary between a home or local network and the Internet. By setting the time to live field(s) 26 of IP headers associated with localized content to a relatively low level, the disclosed apparatus and methods permit transmission of localized data within an IP based home network or within a localized area of an IP network surrounding the source device, while impeding such transmission beyond the home network or localized area. This limitation on the transmission of localized content to a local area of a networked environment is achieved independent of requiring encryption of the localized content or authentication of the transmitting and receiving devices. This control over transmission of localized content is also achieved without violating the layered protocol model and without tying content control messages to lower layers of the protocol stack (e.g., Ethernet frame). The content control technique of the illustrated examples is relatively inexpensive and transparent to users. The disclosed control technique also enables seamless IP transport across multiple physical layer technologies (e.g., wired and wireless).

Persons of ordinary skill in the art will appreciate that the disclosed methods and apparatus are not limited to controlling distribution of proprietary content. Instead, they may be employed to limit distribution of any data or instruction to a local area of a networked environment. Thus, any data and/or instruction, whether proprietary, secret, public, restricted and/or unrestricted may be "localized content" whose distribution is limited by the apparatus and methods disclosed herein.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of limiting transmission of data comprising:
receiving an Internet datagram transmitting digital content;
determining if the digital content comprises localized data that may be transmitted to other devices within a network boundary;
initially setting a value of a time to live parameter of an IP header of the Internet datagram if the digital content comprises localized data, the value representing a number of times the digital content may be transmitted within the network boundary; and
decrementing the value each time the digital content is transmitted.

2. The method of claim 1, wherein
the digital content conforms to Digital Transmission Content Protection (DTCP) technology.

3. The method of claim 1, further comprising:
determining if the value of the time to live parameter exceeds a predetermined value; and
discarding the digital content if the value exceeds the predetermined value.

4. The method of claim 3 wherein
the predetermined value is a set threshold value for each device on the network.

5. The method of claim 4 wherein
the set threshold value is 3.

6. A method comprising:
receiving an Internet datagram transmitting digital content;
determining if the digital content comprises localized data that may be transmitted to other devices within a network boundary;
determining if a value of a time to live parameter of an IP header of the Internet datagram exceeds a predetermined value; and
discarding the digital content if the value exceeds the predetermined value.

7. The method of claim 6 wherein
the predetermined value is a set threshold value for each device on the network.

8. The method of claim 7 wherein
the set threshold value is 3.

9. An apparatus comprising:
a processor;
a localized content identifier configured to execute on the processor to receive an Internet datagram transmitting digital content and to determine if the digital content comprises localized data that may be transmitted to other devices within a network boundary; and
a life limiter configured to execute on the processor to initially set a value of a time to live parameter of an IP header of the Internet datagram if the digital content comprises localized data, the value representing a number of times the digital content may be transmitted within the network boundary, the life limiter further to decrement the value each time the digital content is transmitted.

10. The apparatus of claim 9, wherein
the digital content conforms to Digital Transmission Content Protection (DTCP) technology.

11. The apparatus of claim 9, further comprising:
a tamper tester configured to execute on the processor to determine if the value of the time to live parameter exceeds a predetermined value and to discard the digital content if the value exceeds the predetermined value.

12. The apparatus of claim 11 wherein
the predetermined value is a set threshold value for each device on the network.

13. The apparatus of claim 12 wherein
the set threshold value is 3.

14. An apparatus comprising:
a processor;
a localized content identifier configured to execute on the processor to receive an Internet datagram transmitting digital content and to determine if the digital content comprises localized data that may be transmitted to other devices within a network boundary; and
a tamper tester configured to execute on the processor to determine if a value of a time to live parameter of an IP header of the Internet datagram exceeds a predetermined value and to discard the digital content if the value exceeds the predetermined value.

15. The apparatus of claim 14 wherein
the predetermined value is a set threshold value for each device on the network.

16. The apparatus of claim 15 wherein
the set threshold value is 3.

17. A computer program product comprising:
a non-transitory computer-readable medium;
instructions stored in the computer-readable medium, that, when executed by a machine, cause the machine to:
  receive an Internet datagram transmitting digital content;
  determine if the digital content comprises localized data that may be transmitted to other devices within a network boundary;
  initially set a value of a time to live parameter of an IP header of the Internet datagram if the digital content comprises localized data, the value representing a number of times the digital content may be transmitted within the network boundary; and
  decrement the value each time the digital content is transmitted.

18. The computer program product of claim 17, wherein the digital content conforms to Digital Transmission Content Protection (DTCP) technology.

19. The computer program product of claim 17, wherein the instructions further cause the machine to:
  determine if the value of the time to live parameter exceeds a predetermined value; and
  discard the digital content if the value exceeds the predetermined value.

20. The computer program product of claim 19 wherein the predetermined value is a set threshold value for each device on the network.

21. The computer program product of claim 20 wherein the set threshold value is 3.

22. A computer program product comprising:
a non-transitory computer-readable medium;
instructions stored in the computer-readable medium, that, when executed by a machine, cause the machine to:
  receive an Internet datagram transmitting digital content;
  determine if the digital content comprises localized data that may be transmitted to other devices within a network boundary;
  determine if a value of a time to live parameter of an IP header of the Internet datagram exceeds a predetermined value; and
  discard the digital content if the value exceeds the predetermined value.

23. The computer program product of claim 22 wherein the predetermined value is a set threshold value for each device on the network.

24. The computer program product of claim 23 wherein the set threshold value is 3.

* * * * *